United States Patent
Kwon et al.

(10) Patent No.: US 7,082,353 B2
(45) Date of Patent: Jul. 25, 2006

(54) AIR-CONDITIONING SYSTEM FOR INTEGRATING MULTIPLE AREAS

(75) Inventors: Jae Hwan Kwon, Seoul (KR); Sang Chul Youn, Kyungki-do (KR); Duck Gu Jeon, Seoul (KR); Jae Sik Jung, Seoul (KR); Young Soo Yoon, Seoul (KR); Jun Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 48 days.

(21) Appl. No.: 10/900,099

(22) Filed: Jul. 28, 2004

(65) Prior Publication Data

US 2005/0209739 A1    Sep. 22, 2005

(30) Foreign Application Priority Data

Mar. 22, 2004  (JP)  ............... 10-2004-0019431

(51) Int. Cl.
*G05D 23/00* (2006.01)
(52) U.S. Cl. ............... 700/277; 700/278; 62/132
(58) Field of Classification Search ............ 700/277, 700/278; 236/51; 62/126, 132
See application file for complete search history.

(56) References Cited

U.S. PATENT DOCUMENTS

| 5,279,131 | A  | * | 1/1994  | Urushihata et al. ........ 62/324.1 |
| 6,647,317 | B1 | * | 11/2003 | Takai et al. ................. 700/276 |
| 2005/0204758 | A1 | | 9/2005 | Kwon et al. |

FOREIGN PATENT DOCUMENTS

KR    2001-106802    12/2001

OTHER PUBLICATIONS

English Language Abstract of KR 2001-106802.

* cited by examiner

*Primary Examiner*—Jayprakash N. Gandhi
(74) *Attorney, Agent, or Firm*—Greenblum & Bernstein, P.L.C.

(57) ABSTRACT

An airconditioner system for integrating multiple areas. A plurality of multi-airconditioners are grouped into some groups. CPU connected in parallel to individual multi-airconditioner groups, that have been distributed and installed in a wide area or building, controls individual multi-airconditioner groups to be operated simultaneously, resulting in a shorter control time. Although an unexpected communication failure occurs in one multi-airconditioner group, the remaining multi-airconditioner groups other than the erroneous multi-airconditioner group can be normally controlled, resulting in increased stability and reliability of an overall airconditioning system.

12 Claims, 4 Drawing Sheets

AIR-CONDITIONING SYSTEM FOR INTEGRATING MULTIPLE AREAS

BACKGROUND OF THE INVENTION

1. Field of the Invention

The present invention relates to an air-conditioning system for integrating multiple areas, and more particularly to a multi-airconditioning system for including a plurality of multi-airconditioner groups each composed of one or more indoor units shared with a single outdoor unit, resulting in wide-area air-conditioning effect.

Individual multi-airconditioners can be freely grouped into several multi-airconditioner groups. Individual multi-airconditioner groups are connected in parallel to a CPU (Central Processing Unit), such that a time consumed for controlling predetermined multi-airconditioning groups can be reduced. The remaining multi-airconditioner groups can be normally controlled even though one multi-airconditioner group encounters unexpected errors, resulting in increased control reliability of an overall system.

2. Description of the Related Art

FIG. 1 is a block diagram illustrating a conventional multi-airconditioning system (also called a multi-airconditioner).

Referring to FIG. 1, the multi-airconditioner 30 includes a single outdoor unit 20 and a plurality of indoor units 10 shared with the outdoor unit 20. Individual indoor units 10 are installed for every room, or are installed at intervals of a predetermined distance.

The multi-airconditioner includes individual indoor units shared with a single outdoor unit, such that it has higher operation efficiency as compared to a conventional single-type airconditioner in which an indoor unit is connected to an outdoor unit on a one to one basis, resulting in reduction of both power consumption and installation space for the outdoor unit.

The multi-airconditioning system can enter a control command in all the indoor units to be cooled simultaneously, or can also enter the other control command in some indoor units to be cooled, resulting in greater convenience for a user. Typically, the aforementioned multi-airconditioner installs one outdoor unit on each floor in a building, and installs an indoor unit shared with the outdoor unit for each room contained in the floor.

Therefore, a multi-floor building includes a multi-airconditioner 30 comprised of a single outdoor unit 20 and a plurality of indoor units 10 on each floor of a building.

The outdoor unit 20 must control or manage individual states of its associated indoor units to implement a simultaneous cooling function or a partial cooling function. Therefore, if a user enters a desired cooling command in a specific indoor unit 10, the outdoor unit 20 connected to the indoor unit 10 recognizes which one of the indoor units has received the cooling command, such that it adjusts the degree of condensation of a refrigerant, resulting in effective air-conditioning implementation.

However, if unexpected errors occur in the indoor units 10 for use in the multi-airconditioner, an administrator or manager must access the outdoor unit 20 connected to the plurality of indoor units 10 as shown in FIG. 1, and must enter control commands for repairing/managing the erroneous indoor units in the outdoor unit 20. If outdoor units are installed for every floor as in a huge building, the multi-airconditioner requires a long period of time and expensive costs to manage the outdoor unit.

Therefore, there has recently been developed a CPU (Central Processing Unit) 40 connected to the multi-airconditioners 30 installed on every floor, such that the administrator or manager can centrally control a plurality of outdoor units and their associated indoor units without accessing individual outdoor units by means of the CPU 40.

However, the conventional CPU 40 is connected in series to individual multi-airconditioners, such that an unexpected time delay occurs in a signal transmission time of the CPU 40 if the number of either outdoor units or indoor units contained in the multi-airconditioner increases.

If there is an error in only one outdoor unit from among many outdoor units 20 connected to the CPU 40, all the indoor units 10 connected to a corresponding outdoor unit cannot be controlled, and the remaining outdoor units and their associated indoor units also cannot be controlled, resulting in greater inconvenience of a user.

Furthermore, the sequential flow of signals is made unavailable even when an unexpected error occurs in a communication network connecting the CPU 40 with a plurality of multi-airconditioners, such that the CPU 40 is unable to control the multi-airconditioners.

SUMMARY OF THE INVENTION

Therefore, the present invention has been made in view of the above problems, and it is an object of the invention to provide an air-conditioning system for integrating multiple areas which enables a user to freely group multi-airconditioners each composed of one or more indoor units shared with a single outdoor unit into some multi-airconditioner groups, resulting in wide-area air-conditioning effect.

It is another object of the invention to provide an air-conditioning system for integrating multiple areas in which individual multi-airconditioner groups are connected in parallel to a CPU to reduce a transmission time of a control signal, resulting in a rapid control operation.

It is yet another object of the invention to provide an air-conditioning system for integrating multiple areas in which the remaining multi-airconditioner groups other than a predetermined multi-airconditioner group can be normally controlled even though a communication failure occurs in the predetermined multi-airconditioner group, resulting in high control stability and greater convenience of a user.

In accordance with the present invention, these objects are accomplished by providing an airconditioning apparatus for integrating multiple areas, comprising: a multi-airconditioning system (MS) including one or more multi-airconditioner groups, each comprised of an outdoor unit for performing a refrigerant division function and a refrigerant circulation function and indoor units shared with the outdoor unit to discharge air to individual rooms; a CPU (Central Processing Unit) connected in parallel to individual multi-airconditioner groups (MGs), for including one or more communication modules capable of performing different interface functions for every group, such that it communicates with the multi-airconditioner groups (MGs) over a communication network; and one or more gateways for intermediating signals communicated between the multi-airconditioner groups (MGs) and the communication modules so that the multi-airconditioner groups (MGs) are networked to the CPU.

Preferably, the multi-airconditioner includes an outdoor unit for performing a refrigerant division function and a refrigerant circulation function, and indoor units shared with the outdoor unit to discharge air to individual rooms. Each multi-airconditioner includes a single outdoor unit.

Preferably, if a predetermined number of multi-airconditioners are interconnected to establish one group, this group is called an MG (Multi-airconditioner Group). The MG includes a plurality of outdoor units.

Preferably, if one or more MGs are interconnected to establish an overall system, this system is called a multi-airconditioner system (MS). The multi-airconditioner group (MG) is connected to the CPU over a gateway.

The CPU includes one or more communication modules connected to individual multi-airconditioners. Individual groups are connected in parallel to the communication modules over the gateway.

In this case, the CPU transmits a control command signal received from a user to a corresponding outdoor unit, such that it can control operations of an overall system according to the control command. The CPU receives state information of individual indoor/outdoor units from outdoor units managing individual multi-airconditioners, such that it can centrally check state information of overall multi-airconditioner groups (MGs).

Therefore, the present invention can perform operation control functions and state monitoring functions for every MG from among the multi-airconditioning system (MS) installed in a wide area, resulting in a shorter control time. Although an unexpected communication failure occurs in one multi-airconditioner group, the remaining multi-airconditioner groups other than the erroneous multi-airconditioner group can be normally controlled, resulting in increased stability and reliability of an overall airconditioning system.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
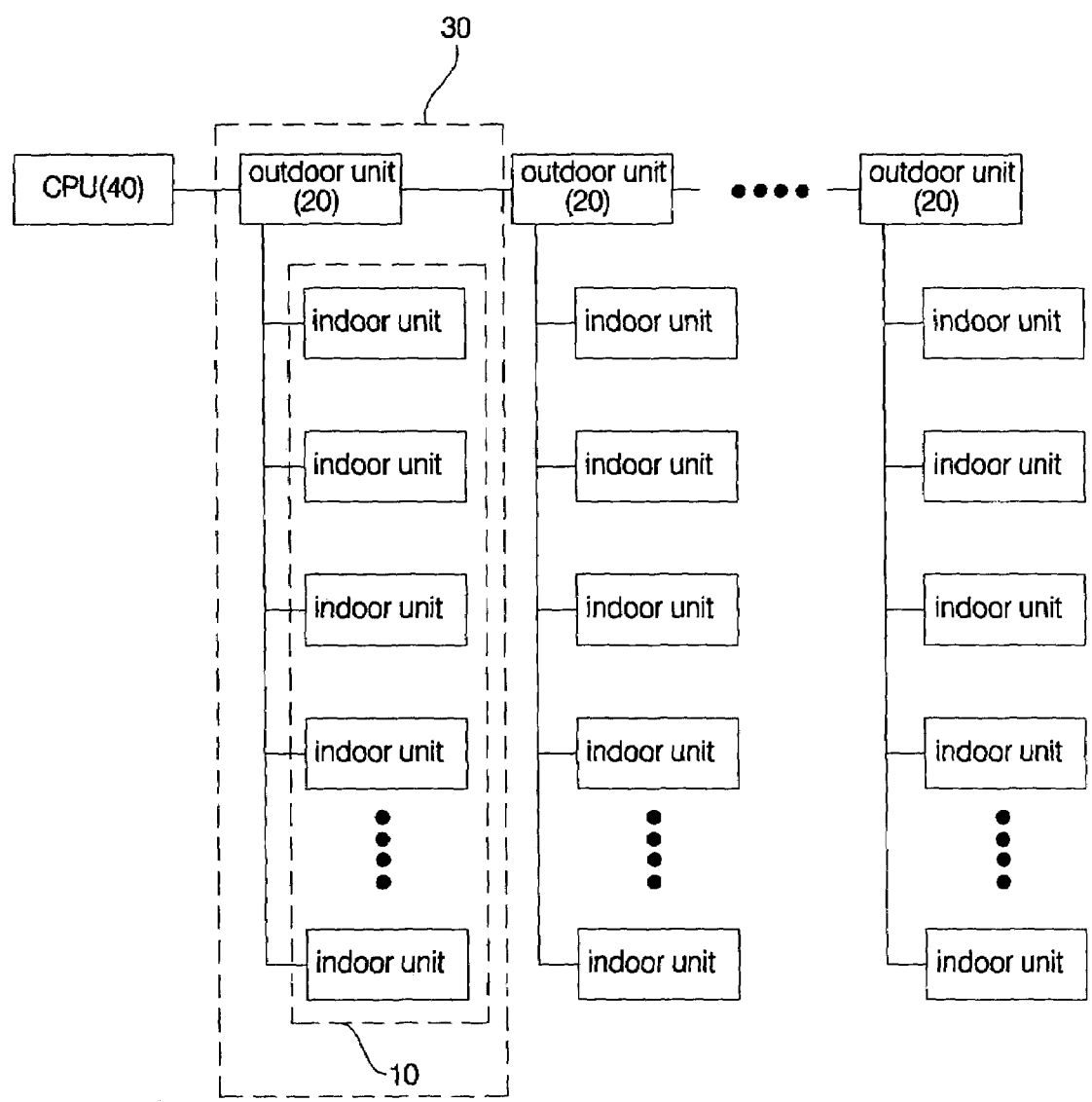
FIG. 1 is a block diagram illustrating a conventional airconditioning system for integrating multiple areas.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

It should be noted that a plurality of airconditioning systems each for integrating multiple areas may be used for the present invention for illustrative purposes. Each airconditioning system can also be called a multi-airconditioning system. Basic configurations of the multi-airconditioning system are equal to those of the conventional art, such that their detailed description will herein be omitted for the convenience of description.

An airconditioning system for integrating multiple areas according to the present invention includes a multi-airconditioning system (MS) including one or more multi-airconditioner groups, each comprised of an outdoor unit for performing a refrigerant division function and a refrigerant circulation function and indoor units shared with the outdoor unit to discharge air to individual rooms; a CPU (Central Processing Unit) connected in parallel to individual multi-airconditioner groups (MGs), for including one or more communication modules capable of performing different interface functions for every group, such that it communicates with the multi-airconditioner groups (MGs) over a communication network; and one or more gateways for intermediating signals communicated between the multi-airconditioner groups (MGs) and the communication modules so that the multi-airconditioner groups (MGs) are networked to the CPU.

Figure 2:
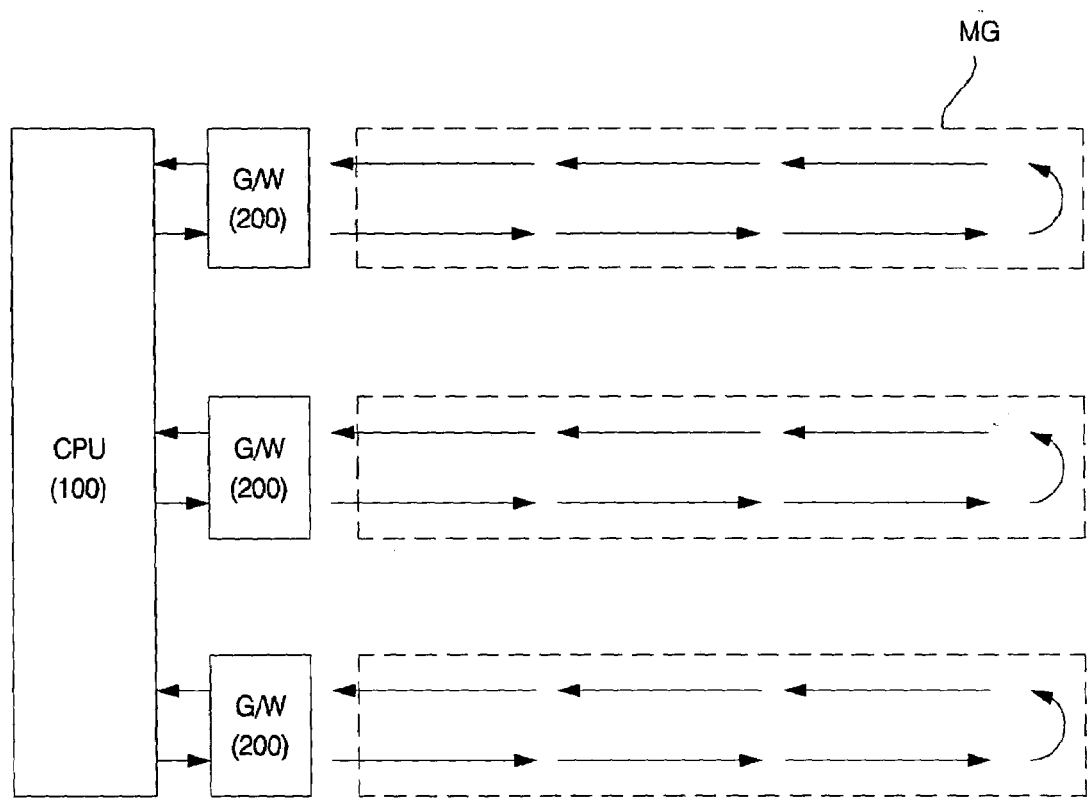
FIG. 2 is a block diagram illustrating an airconditioning system for integrating multiple areas in accordance with the present invention.
Figure 3:
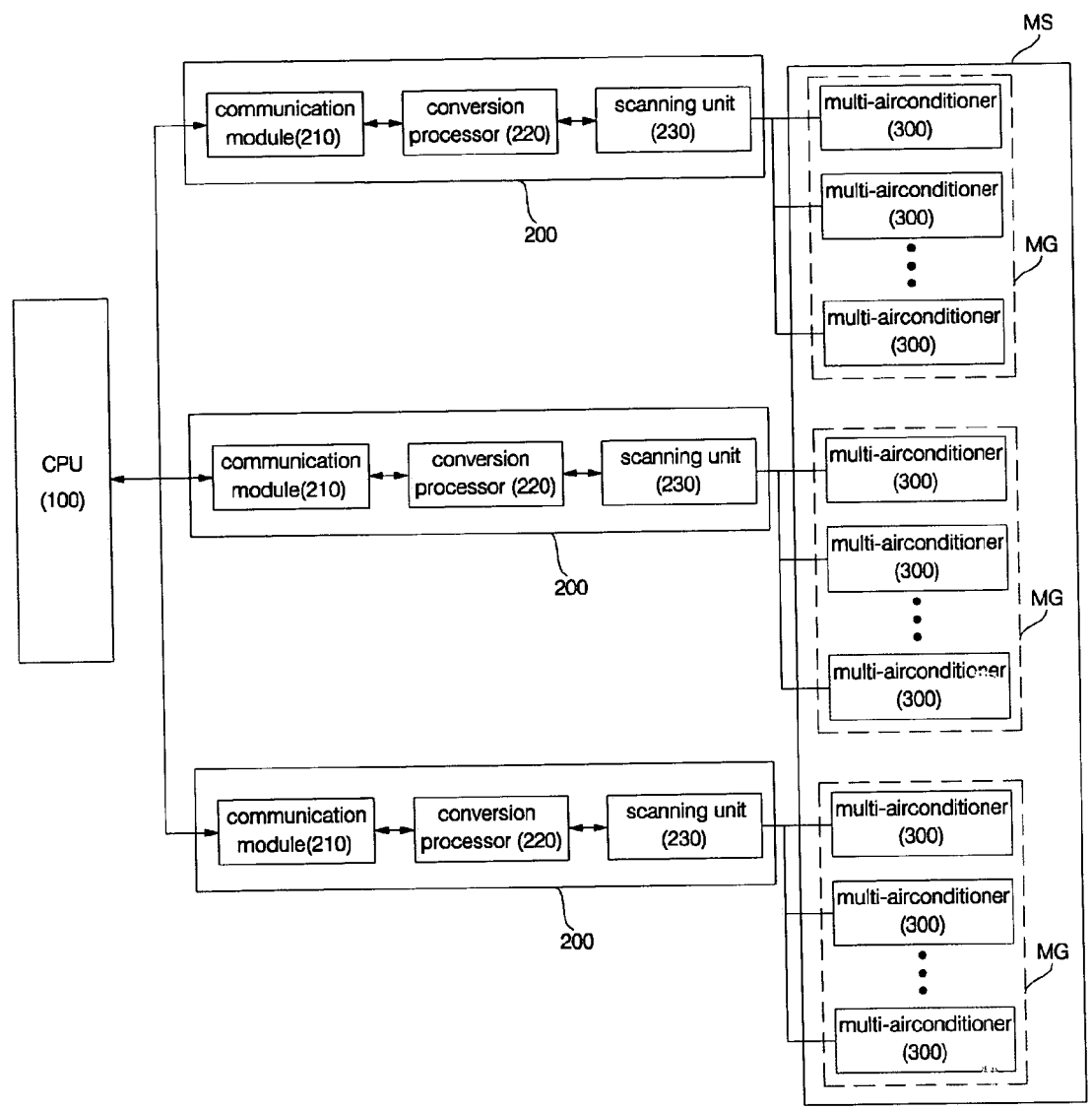
FIG. 3 is a detailed block diagram illustrating the airconditioning system for integrating multiple areas in accordance with the present invention.

FIG. 2 is a block diagram illustrating an airconditioning system for integrating multiple areas in accordance with the present invention. FIG. 3 is a detailed block diagram illustrating the airconditioning system for integrating multiple areas in accordance with the present invention.

Referring to FIGS. 2 and 3, the multi-airconditioning system includes a plurality of multi-airconditioner groups (MGs), a plurality of gateways (G/Ws) 200 connected to individual multi-airconditioner groups (MGs), and a CPU 100 connected to the gateways (G/Ws) to transmit a control command associated with an air-conditioning function to the gateways (G/Ws) and to recognize state information of indoor/outdoor units included in individual multi-airconditioner groups.

The multi-airconditioner 300 includes an outdoor unit for performing a refrigerant division function and a refrigerant circulation function, and indoor units shared with the outdoor unit to discharge air to individual rooms.

A plurality of multi-airconditioners 300 are grouped into some multi-airconditioner groups each composed of a predetermined number of multi-airconditioners. In this case, the multi-airconditioner group is called an MG (Multi-airconditioner Group). In this way, the predetermined number of multi-airconditioners can be grouped into one MG according to a variety of information, for example, area, category, and member information, etc., such that the MG can cover a much wider area and can also perform control operations for every group, resulting in greater control convenience.

If the MGs are connected to each other to establish an overall system, this system is called an MS (Multi-airconditioning System).

The CPU 100 is connected in parallel to individual MGs, and includes one or more communication modules 110 for interfacing data with one or more outdoor units for controlling individual MGs to establish data communication over a communication network.

In this case, gateways 200 for switching or intermediating signal transmission/reception are each positioned between the MGs and the communication modules 110, such that the MGs and the communication modules 110 are connected to each other on a one to one basis.

If a considerable number of airconditioners are distributed and installed into rooms and floors of a building, an overall building, and areas, the airconditioners are grouped into some groups each composed of a predetermined number of airconditioners, resulting in the creation of MGs. individual MGs are connected in parallel to the CPU 100, such that signals can be transmitted/received simultaneously.

In more detail, overall MGs connected in parallel to the CPU 100 to be centrally controlled by the CPU 100 are considered to be a multi-airconditioning system (MS).

Referring to FIG. 3, the CPU 100 includes one or more communication modules 100 for performing interface functions for every group such that it can establish data communication with individual MGs over a communication network. Individual MGs are connected to the communication modules 100 on a one to one basis, and are connected in parallel to the CPU 100.

The communication modules 110 are connected to gateways 200 on a one to one basis, such that individual MGs are networked to the CPU 100. The gateways 200 are adapted to intermediate or switch signals communicated between the MGs and the communication modules 110.

The gateways 200 each interconnect two or more communication networks with each other to establish data communication between different communication networks, and each gateway 200 is arranged between the MS and the communication module 110.

It is preferable for the MS to be connected to a specific network configured in the form of an RS-485 serial communication network. It is preferable for the CPU 100 to be connected to the other network configured in the form of an Ethernet LAN (Local Area Network).

A variety of power communication networks other than the aforementioned networks can also be used, for example, a telephone network implemented in a building, and a power communication network for loading desired data on high-frequency signals from several hundreds of kilohertz (kHz) to several tens of megahertz (MHz) over a low-voltage power line of 100V~220V, etc.

In this way, a variety of communication modules, for example, a wired LAN (Ethernet) communication module, a power-line communication module, and an RF (Radio Frequency) communication module, etc., can be adapted as the communication module 110 according to category information of communication networks.

Therefore, the gateways 200 each include a conversion processor 220 for converting a communication protocol of a signal communicated between the CPU 100 for supporting an Ethernet communication protocol and the multi-airconditioning system (MS) for supporting an RS-485 communication protocol into another communication protocol.

The gateways 200 each include a scanning unit 230 for scanning operation states of individual multi-airconditioners connected to the network, and a communication module 220 for transmitting operation states of the multi-airconditioners scanned by the scanning unit 230 to the CPU 100.

In other words, individual MGs are connected in parallel to the CPU 100, and each MG communicates with the CPU 100 using a unique gateway 200 and a unique communication module 110, such that a signal transmission time consumed for controlling a predetermined airconditioner is reduced compared to the conventional multi-airconditioning system in which multi-airconditioners are connected to each other in series, resulting in implementation of a rapid operation control function and a rapid state monitoring function.

Although an unexpected error occurs in only one MG on the condition that individual MGs have been connected in parallel to each other, the error has no influence on an overall system, such that the remaining MGs other than the erroneous MG can be normally controlled.

If the number of airconditioners interconnected over a communication network increases, or the installation range of the airconditioners becomes wider, a communication module 100 for use in the CPU 100 and a gateway 200 are further included in the present invention in such a way that a new multi-airconditioner group (MG) can be connected to the present invention, resulting in more convenient extension of the multi-airconditioning system (MS) of the present invention.

A detailed configuration of the CPU 100 will hereinafter be described with reference to FIGS. 3 and 4.

Figure 4:
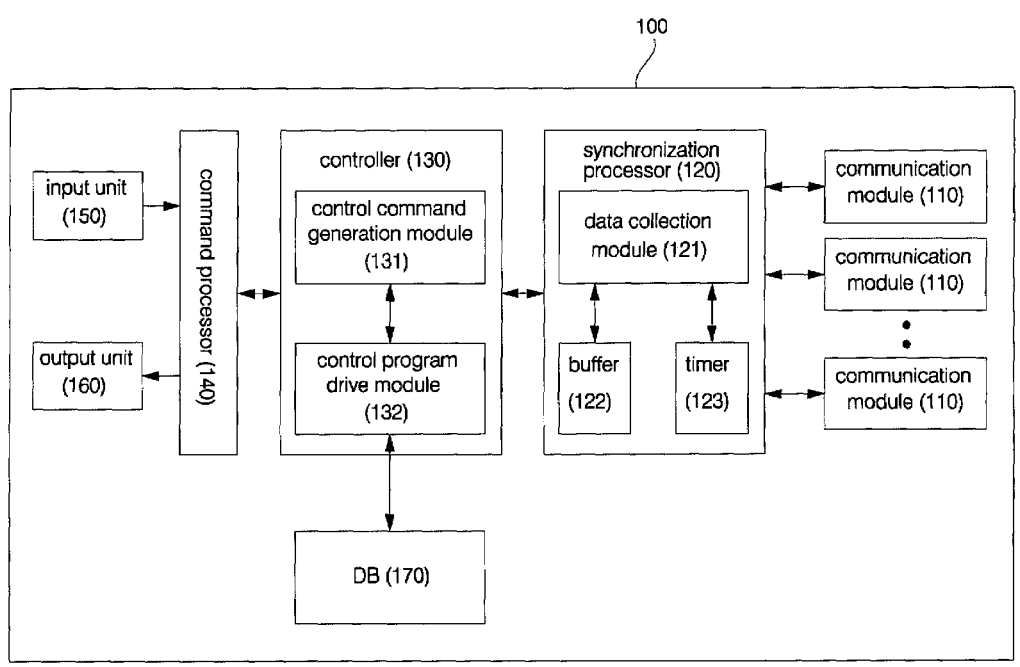
FIG. 4 is a detailed block diagram illustrating a CPU in accordance with the present invention.

Referring to FIG. 4, the CPU 100 includes one or more communication modules 110 for processing signals communicated over gateways 200 for intermediating individual MGs, a synchronization processor 120 for synchronizing signals communicated over one or more communication modules 110, and a controller for recognizing signals synchronized by the synchronization processor 120, and generating a control signal according to an entry control command.

In more detail, the synchronization processor 120 collects signals received by the communication modules 110 during a predetermined period of time, transmits the collected signals to the controller 130 simultaneously, synchronizes different reception signals for every communication module, and transmits the synchronized signals to the controller 130.

The synchronization processor 120 includes a data collection module 121 for collecting signals transferred from individual MGs during a predetermined period of time, and a buffer 122 for temporarily storing airconditioner information to transmit individual multi-airconditioner group information collected by the data collection module 121 to the controller 130 simultaneously.

The synchronization processor 120 further includes a timer 123 for counting or timing a data collection period during which airconditioner information is collected from individual MGs.

The controller 130 includes a control command generation module 131 for generating/transmitting a control signal to control operations of airconditioners according to an entry control command, and a control program drive module 132 for driving a control program which generates operation control result information or operation state information of the airconditioners, and receives a control command to control operations of the airconditioners. Therefore, individual MGs contained in the MS can be controlled by the same control logic.

The conventional airconditioning system connects all of its multi-airconditioners to each other in series, such that a time consumed for collecting signals from N multi-airconditioners connected to the communication network is proportional to the number of multi-airconditioners connected to the network. However, in accordance with the airconditioning system for integrating multiple areas of the present invention, the MG in which M multi-airconditioners are grouped is connected in parallel to the CPU 100, such that different control operations for every group are established. As a result, a time consumed for collecting signals is proportional to the number of multi-airconditioners contained in each group, resulting in a reduced control time.

In more detail, if the synchronization processor 120 contained in the CPU 100 determines a data collection time, a time consumed for collecting signals from a total of N multi-airconditioning systems (MSs) can be shorter than the determined data collection time.

The CPU 100 includes an input unit 150 for receiving control commands to control a variety of operations of the MS, individual MGs, and their multi-airconditioners 300 each comprised of indoor units and an outdoor unit; and an output unit 160 for displaying a variety of state information of the MS, individual MGs, and individual multi-airconditioners 300 to the outside upon receiving a control signal from the controller 130.

The CPU 100 further includes a command processor 140 for receiving I/O (Input/Output) result data generated from a control program for performing a user interface function using the input unit 150 or the output unit 160, and transmitting the received data to the controller 130.

The command processor 140 generates display information needed to display a variety of state information of the MS, individual MGs, and individual multi-airconditioners 300 on the output unit 160, resulting in increased data recognition degree of the user.

The input unit 150 receives a touch-entry signal from the user, so that it can be configured in the form of a touch-screen. In this case, the control program is implemented with a GUI (Graphic User Interface) for displaying one or more buttons needed to receive touch-entry signals from the user.

In more detail, the controller 130 receives MS's signals collected by the synchronization processor 120, displays state information of individual airconditioners, and generates a control signal upon receiving a control command from the input unit 150, such that individual airconditioners can be centrally controlled by the controller 130.

The CPU 100 further includes a database (DB) 170 for storing a variety of information, for example, data received from a control program driven by the control program drive module 132, setup information of outdoor/indoor units contained in individual MGs changed to other MGs by a specific control command, network connection information, and information associated with airconditioners contained in an installation area.

As apparent from the above description, an airconditioning system for integrating multiple areas includes a plurality of multi-airconditioners each composed of a plurality of indoor units shared with a single outdoor unit, resulting in a multi-airconditioner group. The multi-airconditioner group is connected in parallel to a CPU, such that different operation control functions for every multi-airconditioner group are established, resulting in a reduced control time.

Although an unexpected communication failure occurs in 1C one multi-airconditioner group, the remaining multi-airconditioner groups other than the erroneous multi-airconditioner group can be normally controlled, resulting in a guarantee of control stability and greater convenience of a user.

Furthermore, a communication module can be further installed in a specific port of the CPU, the range of a multi-airconditioner group acting as a control object can be extended, resulting in an effective airconditioning effect of a huge building.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An air conditioning apparatus for integrating multiple areas, comprising:
    a multi-unit air conditioning system that includes at least one multi-unit air conditioner group, each multi-unit air conditioner group including an outdoor unit configured to perform refrigerant division and refrigerant circulation and indoor units configured to discharge air to individual rooms;
    a central processing unit connected in parallel to the at least one multi-unit air conditioner group; and
    at least one gateway that intermediates signals between the at least one multi-unit air conditioner group and the central processing unit so that the at least one multi-unit air conditioner group is networked to the central processing unit,
    wherein the central processing unit further comprises:
        at least one communication module configured to process signals communicated over the at least one gateway and to perform different interface functions for the at least one multi-unit air conditioner group;
        a synchronization processor that synchronizes signals for the at least one communication module; and
        a controller that recognizes signals synchronized by the synchronization processor, and that generates a control signal according to an entry control command.

2. The air conditioning apparatus according to claim 1, the communication module further comprising a wired communication module that performs wired communication according to a wired local area network ethernet communication protocol.

3. The air conditioning apparatus according to claim 1, the communication module further comprising a power line communication module that performs data communication over power lines.

4. The air conditioning apparatus according to claim 1, the communication module further comprising a radio frequency communication module that performs data communication using radio frequency signals.

5. The air conditioning apparatus according to claim 1, the central processing unit further comprising:
    an input that receives control commands to control operations of the multi-unit air conditioning system, multi-unit air conditioner groups and individual air conditioners; and
    an output that displays state information of the multi-unit air conditioning system, individual multi-unit air conditioner groups, and individual air conditioners upon receiving a control signal from the controller.

6. The air conditioning apparatus according to claim 5, the central processing unit further comprising:
    a command processor that transmits input and output result data generated from a control program that interfaces data between a user and the controller.

7. The air conditioning apparatus according to claim 1, the central processing unit further comprising:
    a database that stores setup information of individual air conditioners, network connection information, and information associated with individual air conditioners contained in an installation area.

8. The air conditioning apparatus according to claim 1, the controller further comprising:
    a control command generation module that generates and transmits a control signal to control operations of individual air conditioners according to an entry control command; and
    a control program drive module that drives a control program which generates at least one of operation control result information and operation state information of the individual air conditioners, and that receives a control command to control operations of the individual air conditioners.

9. The air conditioning apparatus according to claim 1, the synchronization processor further comprising:
a data collection module that collects signals transferred from multi-unit air conditioner groups during a predetermined period of time, and a buffer that temporarily stores air conditioner information to transmit multi-unit air conditioner group information collected by the data collection module to the controller.

10. The air conditioning apparatus according to claim 9, the synchronization processor further comprising:
a timer that at least one of counts and times a data collection period during which air conditioner information is collected from individual multi-unit air conditioner groups.

11. The air conditioning apparatus according to claim 10, the at least one gateway further comprising:
a scanning unit that scans operation states of individual multi-unit air conditioner groups connected to a network; and
a communication module that transmits operation states of the multi-unit air conditioner groups scanned by the scanning unit to the central processing unit.

12. The air conditioning apparatus according to claim 1, the at least one gateway further comprising:
a conversion processor that converts at least one of an ethernet communication protocol for the central processing unit and an RS-485 communication protocol for an air-conditioning system into another protocol.

* * * * *